Figure 1:
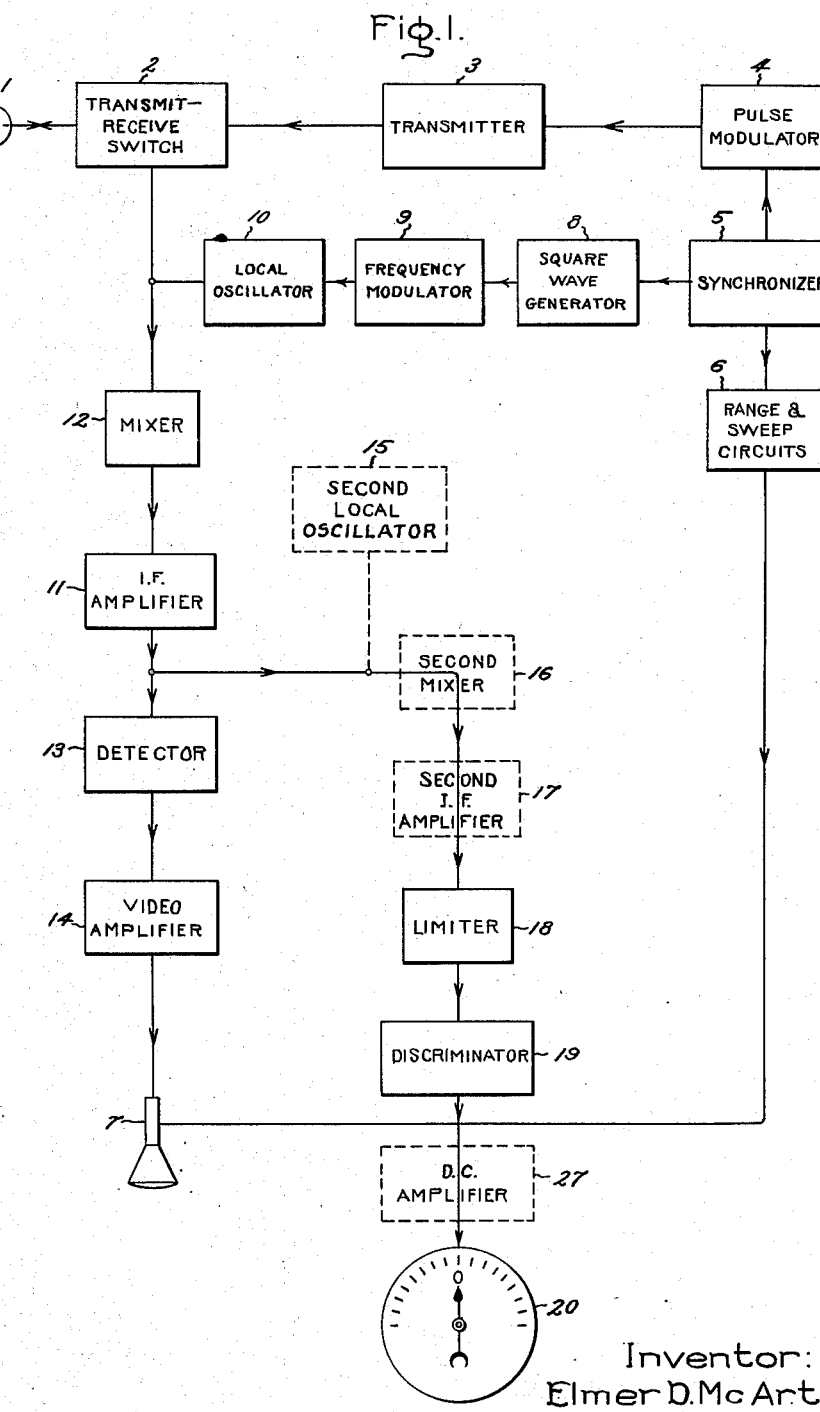

May 27, 1958 E. D. McARTHUR 2,836,811
RADAR SYSTEM FOR DETECTING OBJECT MOVEMENT AND VELOCITY
Filed Jan. 18, 1951 3 Sheets-Sheet 3

Inventor:
Elmer D. McArthur,
by Paul A. Frank
His Attorney.

United States Patent Office 2,836,811
Patented May 27, 1958

2,836,811
RADAR SYSTEM FOR DETECTING OBJECT MOVEMENT AND VELOCITY

Elmer D. McArthur, Schenectady, N. Y., assignor to General Electric Company, a corporation of New York Application January 18, 1951, Serial No. 206,564

6 Claims. (Cl. 343—8)

My invention relates to apparatus utilizing electromagnetic waves for detecting the presence, position, and range of objects or targets, and more particularly to such apparatus for determining, as well, the velocity and direction of movement of moving objects. Such apparatus comes under the general classification of radar systems, of which there are two distinct generic types commonly known as pulse radar and continuous wave radar.

A pulse radar system comprises apparatus for transmitting short bursts or pulses of high frequency energy, a receiver for detecting echoes resulting from the reflection of the pulses from distant objects, and means for determining the time intervals between the original pulses and the pulse echoes. The range of the reflecting objects may thereby be determined, since the time interval between a pulse and its echo is directly related to the range or distance in accordance with the velocity of propagation of electromagnetic waves.

A continuous wave radar system comprises apparatus for transmitting high frequency waves, generally of a type whose instantaneous frequency is cyclically varied between definite limits at a predetermined rate, receiving apparatus for detecting the presence of energy occurring as a result of reflection from distant objects, and means for determining the range of reflecting objects as a function of the difference in phase or frequency between the transmitted energy and the reflected energy. Since the instantaneous frequency of the transmitted energy may be varied at a linear rate, and since the time interval between the transmission of energy at one instantaneous frequency and its return is a linear function of the range of the reflecting object, it is then a relatively simple matter to correlate frequency shift and range.

While the pulse radar system is perhaps simpler and in more general use, both it and the frequency modulation system have certain advantages for different types of application, and also have definite limitations which restrict their usefulness.

In certain applications of radar systems, it is particularly desirable that such systems yield information as to whether or not a detected object is moving, and, if moving, the direction and velocity of such movement. Actually, such movement and velocity information about a moving object is often useful if it pertains only to the radial component of the object's movement with respect to the location of the radar system. Radial movement is defined as that component of total movement of the detected object which falls along a line instantaneously connecting the detected object and the location of the radar system. Thus, if an object is moving in a circle which has the radar system location for its center, there is no radial movement present; and, if an object is moving directly toward the radar system location, its entire movement is radial movement. Such radial movement and velocity information in the form of a D.-C. voltage, for example, may be used to actuate alarms or may be quickly used for activation of a servo-control system of associated equipment.

At the present time, a few improved frequency modulation radar systems yield such information in the form of electrical signals, but the methods employed involve intricate circuits for frequency modulation of the transmitted energy, simultaneous transmission of two or more waves of different frequencies, measurement of phase difference between two oscillating signals, or combinations of these. The conventional pulse type radar is basically more simple in principle and construction but does not supply such information in the form of a D.-C. electrical signal and, therefore, movement of an object can only be observed by an operator noting the changing position of the object as shown on a cathode ray tube screen. Such observations are, at best, only moderately accurate and the velocity of an object can only be determined after time-consuming calculations.

It is, therefore, an object of my invention to provide a simple radar system of the pulse type capable of detecting instantly radial movements of objects with respect to the system location.

It is a further object of my invention to provide a radar system of the pulse type which determines the radial direction of movement of a moving object.

It is a still further object of my invention to provide a radar system of the pulse type which measures the radial component of velocity of a moving object and yields such information in the form of an electrical signal.

In carrying out my invention, I provide the usual well-known elements of a conventional pulse type radar system and add certain other well-known components in order that the local oscillator repetitively varies its output frequency in square wave fashion about some average frequency, the period of the square wave repetitions being equal to twice the period between successive radiated pulses of high constant frequency energy. Echo pulses are received at a frequency greater or less than the transmitted frequency from an object moving respectively toward or away from the receiver, due to the well-known Doppler effect, such Doppler shift in frequency being proportional to the radial velocity of the object. When echo pulses are reflected from a stationary object, there is no Doppler shift in frequency and the average intermediate frequency of pulses formed from the combination of the reflected pulses and the local oscillator output is the sum or difference of the transmitter frequency and the average local oscillator frequency. Therefore, the average intermediate frequency of successive echo pulses received from a moving target is shifted from the average intermediate frequency caused by echo pulses from a stationary object in a direction indicative of radial direction of object movement and by an amount proportional to radial object velocity. The echo pulses of intermediate frequency are put into a frequency discriminator preferably having a linear operating characteristic passing through zero voltage output for the frequency input which is the aforementioned average intermediate frequency caused by a stationary object. Thus, the voltage output of the discriminator is zero when the detected object is stationary and is something other than zero when the detected object is moving, the polarity of the output voltage indicating radial direction of movement and the magnitude of the output voltage being proportional to radial velocity of movement with respect to the location of the radar system.

Figure 2:
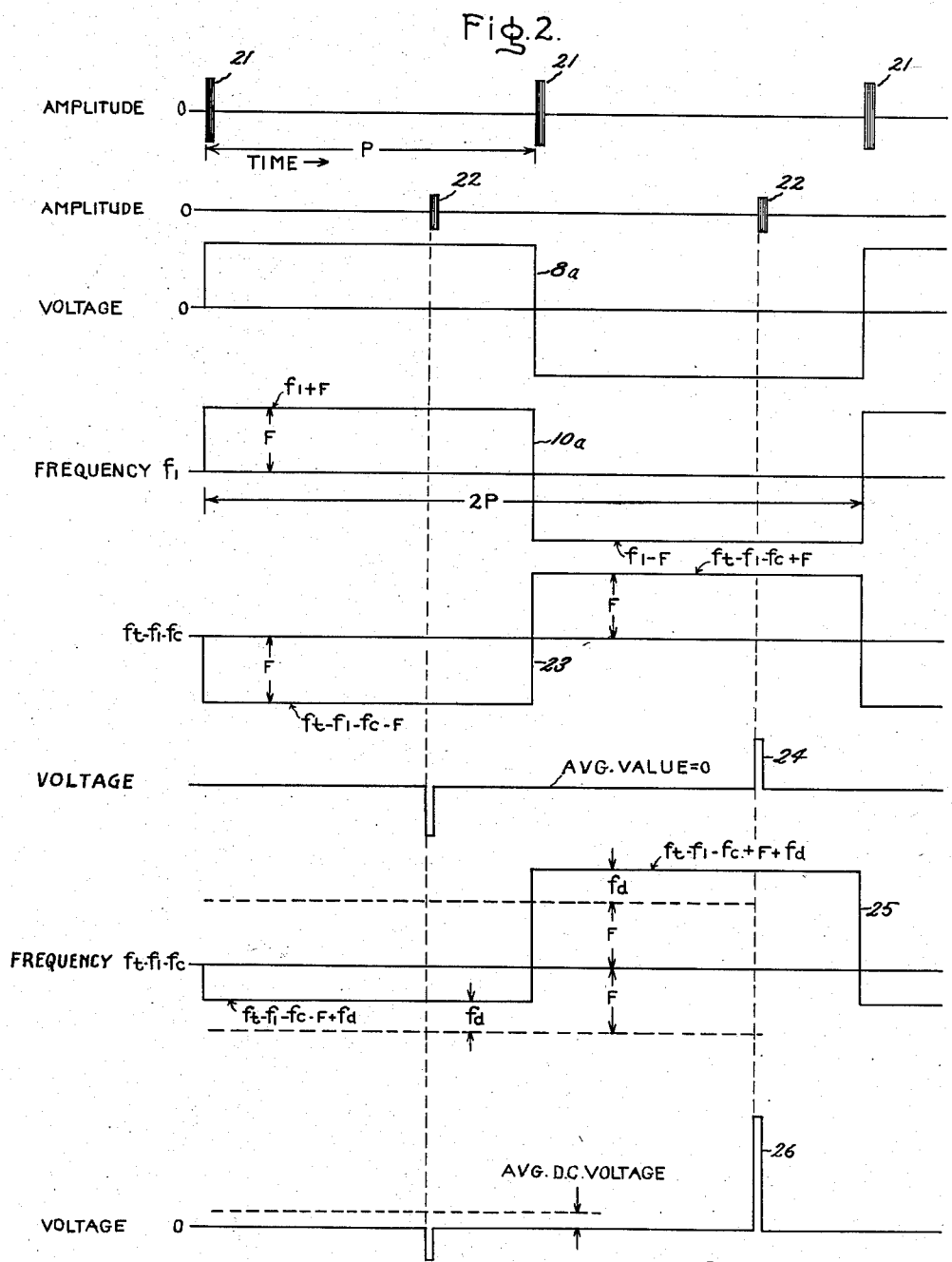
Figure 3:
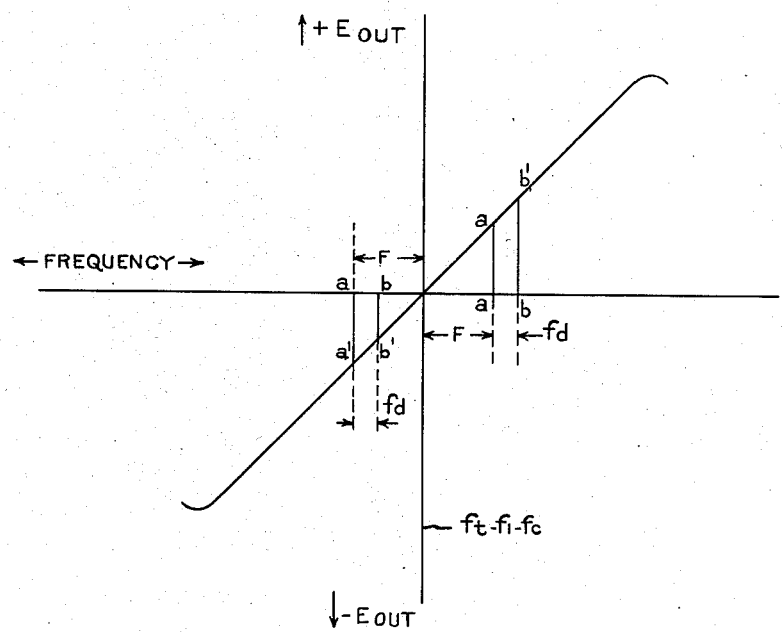

For a better understanding of my invention, together with further objects and advantages thereof, reference should now be had to the following description referring to the accompanying drawings in which Fig. 1 is a simplified schematic diagram, in block form, of a radar system embodying my invention; Fig. 2 comprises a series of curves, drawn to a common time scale, illustrating certain voltage and frequency variations during operation of the radar system shown in Fig. 1; and Fig. 3 is a curve of the operating characteristic of the discriminator shown in the diagram of Fig. 1.

Referring now to Fig. 1, a one-line block diagram of a radar system is shown, including an antenna 1 connected to any suitable form of automatic transmit-receive switch 2, which makes possible the use of a single antenna 1 to alternately transmit and receive pulses of high frequency energy. A transmitter 3, modulated by a pulse modulator 4 which is triggered periodically by a synchronizer 5, feeds high constant-frequency energy pulses, as illustrated at the top of Fig. 2, out of antenna 1 through switch 2. The synchronizer 5 supplies a pulse signal, in conventional manner, to range and sweep circuits 6, in order that they may cause sweeping of the electron beam in a cathode ray tube 7 with proper timing and geometry. Synchronizer 5 also supplies a pulse signal to synchronize the operation of a square wave generator 8, which generates a voltage of the form illustrated by curve $8a$ of Fig. 2. It will be later observed that this is a symmetrical square wave voltage having a fundamental frequency of repetition one-half that of the repetition frequency of the pulses transmitted through antenna 1. A suitable form of generator 8 may, for example, be that shown and described in Patent 2,410,703 of Seymour Berkoff and Robert B. Dome, which was issued November 5, 1946, and which is assigned to the same assignee as the present invention.

The square voltage wave $8a$ from generator 8 controls the operation of a suitable frequency modulator 9 which, in turn, causes the frequency output of a local oscillator 10 to vary synchronously in square wave fashion, as shown by curve $10a$ of Fig. 2. Since the possible frequency variations in intermediate frequency produced by heterodyning the echo pulses (shifted from the transmitted frequency by a small amount due to the Doppler effect) and the square wave varying frequency output of local oscillator 10 are small compared to the average intermediate frequency so produced, an intermediate frequency amplifier 11 causes little or no distortion, due to the moderate range of frequencies which may be put out of a mixer 12 as a result of the echo pulses, shifted from the transmitted frequency in accordance with the Doppler effect, and the varying frequency of local oscillator 10. A detector 13, a video amplifier 14, and cathode ray tube 7 may be added to the system to function in a normal well-known manner. A second local oscillator 15 may be provided to supply a constant frequency voltage output which, together with a portion of the first intermediate frequency voltage pulses, allows a second mixer 16 to produce voltage pulses of a second intermediate frequency which may be amplified by a second intermediate frequency amplifier 17. The second intermediate frequency is, on the average, much smaller than the first intermediate frequency, but, however, still contains the same magnitude of variations caused by any Doppler shift from the transmitted frequency in the echo pulses and the frequency variations of local oscillator 10. Therefore, second intermediate frequency amplifier 17, if present, is made to have a flat response over such frequencies. The voltage output of second intermediate frequency amplifier 17 is fed through a limiter 18, which clips the pulses to a uniform amplitude, and thence to a discriminator 19 which preferably has a linear operating characteristic such as that shown in Fig. 3. The D.-C. output of discriminator 19 may be fed, as shown, to a double-deflecting voltmeter 20 calibrated directly in velocity units, one side of the scale for velocities toward the antenna, and the other side for velocities away from the antenna.

No detailed description or illustration of the elements shown and described in this radar system is believed necessary, as these elements are well-known to those skilled in the art and their individual details form no part of my invention.

If discriminator 19 can be made to possess sensitive operating characteristics at relatively high frequencies, the elements 15, 16, and 17, shown by dashed lines in Fig. 1, may be omitted and the operation will be the same in principle without the use of a second intermediate frequency. On the other hand, it may be desirable in some cases to add several such mixing combinations, each reducing the magnitude of the signal frequencies but maintaining any frequency variations therein.

In typical operation, transmitter 3 sends out energy pulses 21, as illustrated in Fig. 2, at a constant frequency, for example, $f_t$ having a time duration in the order of 2 microseconds and spaced at time intervals in the order of 2000 microseconds, and the antenna 1 receives echo pulses 22 reflected from the detected object. The frequency of local oscillator 10 varies alternately from, say, $f_1+F$ to $f_1-F$, as shown by curve $10a$. It is to be noted at this point that the period between repetitive variations of local oscillator frequency, indicated by the time interval $2P$ on curve $10a$ of Fig. 2, is twice the period between successive radiated pulses 21, as indicated by the time interval $P$ in Fig. 2.

Now, in the case that the detected object is stationary, the echo pulses are received at the transmitted frequency $f_t$, i. e., with no Doppler shift. Taking difference frequencies, each pair of succeeding echo pulses from mixer 12 and intermediate frequency amplifier 11, will then be of intermediate frequencies, respectively, $f_t-f_1-F$ and $f_t-f_1+F$. These may be further heterodyned by second mixer 16 with the constant frequency $f_c$ of the second local oscillator 15, and amplified and clipped by second intermediate frequency amplifier 17 and limiter 18 to produce a pair of succeeding echo pulses at the discriminator 19 of second intermediate frequencies, respectively, $f_t-f_1-f_c-F$ and $f_t-f_1-f_c+F$, as shown by curve 23. The zero voltage output point of discriminator 19 is at the frequency $f_t-f_1-f_c$ and, therefore, each pair of these pulses produce equal positive and negative voltage outputs, shown by lines $aa'$ in Fig. 3, from the discriminator which cancel each other and give zero average voltage output, as shown by curve 24.

Next, taking the case where the detected object is moving toward the antenna, the echo pulses are received at a frequency $f_t+f_d$, the $f_d$ increase being proportional to the radial velocity of approach of the target in accordance with the Doppler principle. In this case, the first intermediate frequencies of a pair of succeeding pulses are, respectively, $f_t-f_1-F+f_d$ and $f_t-f_1+F+f_d$ and after the second mixing and amplification will be supplied to the discriminator 19 at the lower respective frequencies $f_t-f_1-f_c-F+f_d$ and $f_t-f_1-f_c+F+f_d$, as shown by curve 25. A pair of succeeding pulses will then operate on the discriminator characteristic at points shown by lines $bb'$ to produce alternately unequal positive and negative voltage outputs from the discriminator 19 which result in a positive average D.-C. voltage output, as shown by curve 26.

If the object were moving away from the antenna 1, the operation of the system would be the same, except that the Doppler shift $f_d$ would be negative and the operating lines $bb'$ would then be shifted to the left on Fig. 3, resulting in unequal voltage output pulses having a negative D.-C. voltage average.

Therefore, it is seen that this system yields zero D.-C. voltage output from discriminator 19 when a stationary object is detected, and a D.-C. voltage output, of polarity indicating radial direction of movement and of magnitude proportional to radial velocity of movement, when a moving object is detected. The D.-C. voltage output may be used in various other ways than the one shown and described. For example, several voltmeters, such as voltmeter 20, calibrated in velocity units in both directions of deflection, may be located at distances from the radar equipment and constitute object movement information repeaters, all connected by suitable wires to the discriminator output terminals; the D.-C. voltage output of discriminator 19 may be used to actuate alarms warning of a moving object in the vicinity, or of objects approaching at a velocity greater than some predetermined velocity; or the D.-C. voltage output of discriminator 18 may be used to actuate electrical control devices for automatic tracking equipment and the like.

Since the Doppler shift of frequency due to object movement is relatively small, this invention may be limited in practical use to supplying movement information about objects moving at relatively high velocities, and it is to be understood that the discriminator 19 and voltmeter 20 shown in Fig. 1 should be constructed to have great sensitivity. In some cases, a D.-C. amplifier 27, shown by dashed lines in Fig. 1, may be used between the output terminals of the discriminator 19 and the apparatus to which this output is supplied.

While the present invention has been described by reference to a particular embodiment thereof, it will be understood that numerous modifications may be made by those skilled in the art without actually departing from the invention. I, therefore, aim in the appended claims to cover all such equivalent variations as come within the true spirit and scope of the foregoing disclosure.

What I claim as new and desire to secure by Letters Patent of the United States is:

1. A radar system comprising means for periodically generating and radiating pulses of high constant-frequency energy, means for receiving echo pulses resulting from the reflection of said energy from an object, means for generating local oscillations, means for varying the frequency of said local oscillations in symmetrical square wave manner synchronized with and having a repetition period equal to twice the period between successive radiated pulses, means for combining said echo pulses and said local oscillations to produce pulses of frequency dependent upon the instantaneous frequency of said local oscillations and any Doppler shift to the transmitted frequency present in said echo pulses, and means for producing a D.-C. voltage of polarity dependent upon the direction of said Doppler shift in frequency and of magnitude proportional to the magnitude of said Doppler shift in frequency.

2. A radar system comprising a transmitter for radiating periodic pulses of high and constant frequency energy, a receiver for receiving echo pulses resulting from the reflection of said radiated pulses from an object, a local oscillator for generating local oscillations, means for varying the frequency of said local oscillations in symmetrical square wave manner synchronized with and having a repetition period equal to twice the period between successive radiated pulses, a mixer for combining said echo pulses and said oscillations to produce pulses of first intermediate frequencies dependent upon the instantaneous frequency of said oscillations and any Doppler shift to the transmitted frequency present in said echo pulses, means for producing pulses of lower second intermediate frequencies dependent upon the value of said first intermediate frequencies, and a discriminator for converting said pulses of second intermediate frequencies into a D.-C. voltage of polarity dependent upon the direction of any said Doppler shift in frequency and of magnitude proportional to the magnitude of any said Doppler shift in frequency.

3. A radar system comprising a transmitter for radiating periodic pulses of high constant-frequency energy, a receiver for receiving echo pulses resulting from the reflection of said radiated pulses from an object, a local oscillator for generating local oscillations, means for varying the frequency of said local oscillations in symmetrical square fashion synchronized with and having a repetition period equal to twice the period between successive ones of said radiated pulses, a mixer for combining said oscillations and said echo pulses to produce alternate pulses of different intermediate frequencies both dependent upon the instantaneous frequency of said oscillations and any Doppler shift to the transmitted frequency present in said echo pulses, a second local oscillator for generating oscillations of a constant frequency, a second mixer for combining said pulses of intermediate frequencies and said oscillations of constant frequency to produce alternate pulses of different second intermediate frequencies both dependent respectively upon the first intermediate frequencies, an amplifier to amplify said pulses of second intermediate frequencies, a limiter to equalize the amplitude of said pulses amplified by said amplifier, a discriminator for producing from the said equalized pulses a D.-C. voltage of polarity dependent upon direction of said Doppler shift in frequency and of magnitude proportional to the magnitude of said Doppler shift in frequency, and a D.-C. amplifier for amplifying said D.-C. voltage produced by said discriminator.

4. In combination, means for transmitting recurrent pulses of energy having a given frequency, means for receiving reflected pulses of said wave energy from a remote object, means for deriving local oscillations having a frequency variable in square-wave fashion between two limits displaced from said given frequency, the frequency of said oscillations remaining at each of said limits during alternate ones of the intervals between successive ones of said recurrent pulses, means for combining said energy of said reflected pulses and said local oscillations to produce resulting pulses of energy having a frequency dependent upon the instantaneous frequency of said local oscillations and any Doppler shift in frequency in said energy of said reflected pulses, and means coupled to said last-mentioned means and responsive to said energy of said resulting pulses for producing an indication of said Doppler shift in frequency.

5. In combination, means for transmitting recurrent pulses of wave energy having a given frequency, means for receiving reflected pulses of said wave energy from a remote object, means synchronized with said recurrent pulses for deriving a rectangular wave having a magnitude alternating between limiting values during successive intervals, each such interval occurring during the period between successive ones of said recurrent pulses, means responsive to said rectangular wave for producing local oscillations having a frequency variable between two frequency limits in accordance with the instantaneous magnitude of said rectangular wave, means for combining said wave energy of said reflected pulses and said local oscillations to produce resulting pulses of wave energy having a frequency dependent upon the instantaneous frequency of said local oscillations and any Doppler shift in frequency in said wave energy of said reflected pulses, and means coupled to said last-mentioned means and responsive to said wave energy of said reflected pulses for producing an indication of said Doppler shift in frequency.

6. In combination, means for transmitting recurrent pulses of energy having a given frequency, means for receiving corresponding pulses of energy from a remote object, means for deriving local oscillations having a frequency variable in square-wave fashion between two limits displaced from said given frequency, the frequency of said oscillations remaining at each of said limits during alternate ones of the intervals between successive ones of said recurrent pulses, means for combining said energy of said corresponding pulses and said local oscillations to produce resulting pulses of energy having a frequency dependent upon the instantaneous frequency of said local oscillations and any Doppler shift in frequency in said energy of said corresponding pulses, frequency-responsive means coupled to said last-mentioned means for deriving a control potential of a magnitude and polarity proportional to the amount and direction of said Doppler shift, and an indicator coupled to said frequency-responsive means for utilizing said control potential to produce an indication of the velocity of said remote object.

References Cited in the file of this patent

UNITED STATES PATENTS

| 2,406,316 | Blumlein et al. | Aug. 27, 1946 |
| 2,451,822 | Guanella | Oct. 19, 1948 |
| 2,479,568 | Hansen | Aug. 23, 1949 |
| 2,541,066 | Jaynes | Feb. 13, 1951 |